United States Patent
Brock, II et al.

(10) Patent No.: US 9,291,192 B2
(45) Date of Patent: Mar. 22, 2016

(54) CONNECTING ROD WITH BEARING-LESS LARGE END

(71) Applicant: Mahle International GmbH, Stuttgart (DE)

(72) Inventors: Ronald G. Brock, II, Oxford, MI (US); Viviane Morais, Commerce Township, MI (US); Joachim Wagenblast, Bloomfield Hills, MI (US); David Maloney, Northville, MI (US)

(73) Assignee: Mahle International GmbH (GB)

( * ) Notice: Subject to any disclaimer, the term of this patent is extended or adjusted under 35 U.S.C. 154(b) by 0 days.

(21) Appl. No.: 14/305,020

(22) Filed: Jun. 16, 2014

(65) Prior Publication Data

US 2014/0366833 A1   Dec. 18, 2014

Related U.S. Application Data

(60) Provisional application No. 61/835,985, filed on Jun. 17, 2013.

(51) Int. Cl.
*F16C 7/00* (2006.01)
*F16C 7/02* (2006.01)
*F02B 75/32* (2006.01)
(Continued)

(52) U.S. Cl.
CPC ............... *F16C 7/023* (2013.01); *F02B 75/32* (2013.01); *F16C 9/04* (2013.01); *F16C 33/205* (2013.01); *F16J 7/00* (2013.01); *F02B 75/22* (2013.01); *F16C 17/028* (2013.01); *F16C 2223/42* (2013.01); *F16C 2240/60* (2013.01);
(Continued)

(58) Field of Classification Search
CPC .............. F16C 7/023; F16C 7/00; F16C 9/04; F16C 33/205; F16C 2240/60; F16C 2223/42
See application file for complete search history.

(56) References Cited

U.S. PATENT DOCUMENTS 6,329,022 B1   12/2001   Schlegel et al.
6,367,151 B1   4/2002   Schlegel et al.
(Continued)

FOREIGN PATENT DOCUMENTS

DE   102004026297 A1   9/2005
EP   0863322 B1   11/2003
EP   2370703 B1   8/2013

*Primary Examiner* — Lindsay Low
*Assistant Examiner* — Jacob Amick
(74) *Attorney, Agent, or Firm* — Fishman Stewart PLLC

(57) ABSTRACT

A connecting rod of an internal combustion engine, that includes a large bore, and an interior bore surface. The current art uses soft metal bearing surfaces to reduce wear, and friction between the connecting rod inner diameter and the crankshaft journal surface. The soft metal bearing surface is a separate component of the engine. In this invention the large bore end interior diameter is coated with a hard material to reduce, or eliminate wear. The hard material is a metal or metal alloy applied to the inner diameter by a thermal spray method. A relatively soft polymer material can also be applied to the interior diameter surface of the con-rod bore. The relatively softer polymer acts as a first and sometimes a consumable layer, and applied over the thermal sprayed hard layer. The polymer layer is often used in conjunction with the sprayed metal layer. The polymer coating may be worn off the inner diameter surface; this delay in surface to surface contact to the sprayed metal layer has beneficial effects on the sprayed metal layer. The delay of surface to surface contact will usually result in a longer service life of the sprayed metal coating.

19 Claims, 6 Drawing Sheets

(51) Int. Cl.
  *F16C 9/04* (2006.01)
  *F16C 33/20* (2006.01)
  *F16J 7/00* (2006.01)
  *F02B 75/22* (2006.01)
  *F16C 17/02* (2006.01)

(52) U.S. Cl.
  CPC ......... *F16C2240/70* (2013.01); *F16C 2360/22* (2013.01); *Y10T 74/2162* (2015.01)

(56) References Cited

U.S. PATENT DOCUMENTS

| | | |
|---|---|---|
| 6,379,754 B1 | 4/2002 | Schlegel et al. |
| 6,428,630 B1 | 8/2002 | Mor et al. |
| 6,513,238 B1 | 2/2003 | Schlegel |
| 6,560,869 B1 | 5/2003 | Schlegel et al. |
| 6,861,101 B1 | 3/2005 | Kowalsky et al. |
| 7,178,238 B2 | 2/2007 | Rumpf et al. |
| 7,887,922 B2 | 2/2011 | Mayston et al. |
| 7,963,699 B2 | 6/2011 | Kraemer et al. |
| 8,234,785 B2 | 8/2012 | Guerreiro |
| 2004/0025626 A1* | 2/2004 | Burns, Jr. .................... 74/579 R |
| 2006/0117947 A1* | 6/2006 | Tabata et al. ................... 92/223 |
| 2008/0283021 A1 | 11/2008 | Maier et al. |
| 2011/0317955 A1 | 12/2011 | Mayston et al. |
| 2012/0114971 A1* | 5/2012 | Andler et al. ................. 428/647 |

\* cited by examiner

CONNECTING ROD WITH BEARING-LESS LARGE END

This application claims priority to provisional application No. 61/835,985 filed on Jun. 17, 2011, the content of which is hereby entirely incorporated by reference into this application.

BACKGROUND

The present invention relates to a bearing-less connecting rod, and a method of producing a connecting rod The present invention also relates to an internal combustion engine, and an automotive vehicle including such a connecting rod.

The connecting rod is used for linking a crankshaft to a piston. The connecting rod includes a bar-like rod main body a small end which is provided at one end of the rod main body. A large end is provided at the other end of the rod main body. The thicker the connecting rod body, the higher the load can be applied to the con-rod during engine operation The small end of the con rod contains a piston pin bore and allows a piston pin to extend through said bore. The small end is mechanically connected to a piston via the piston pin. Opposite the small end, the large end of the con rod contains a crankpin bore for allowing a crankshaft journal to extend through said bore. The big end is mechanically connected to a crankshaft.

In this invention embodiment, the big end is split into two pieces. The rod portion continues from one end of the rod main body. The cap portion is coupled to the rod portion with bolts. The connecting rod in this invention is referred to as a split-type connecting rod.

Requirements on the mechanical characteristics of a connecting rod differ from region to region. For example, the small end and rod main body of a connecting rod are required to have a high strength and a high toughness so as not to undergo fatigue failure or impact failure during use. The big end of the connecting rod is designed so diameter surface of the bore does not deform from the friction against the crankshaft journal.

If an alloy whose elastic modulus is lower than that of steel is used as the material of a connecting rod, weight reduction may be achieved, but the rigidity of the big end will be insufficient. Designing a connection rod to have a size for attaining sufficient rigidity will detract from the advantage of weight reduction.

Connecting rods transmit power generated during the combustion cycle from the piston to the crankshaft of the engine. Connecting rods are usually defined by a first end and a second end. The first end and the second end both typically include an aperture present on each end of the connecting rod. Typically, the aperture present in the first end of the connecting rod is smaller than the aperture present in the second end of the connecting rod. The aperture in the first end of the connecting rod is configured to connect to the piston by way of a piston pin. The aperture in the second end of the connecting rod is configured to connect to the crankshaft by way of a crankshaft pin.

Steel is the most common material used to manufacture connecting rods and crankshaft journals. The gap between the big end inner diameter and the crankshaft journal is very small. The gap size is on the order of 0.005 inches. The close tolerances between the inside bore of the con rod and the journal surface of the two components restricts the amount of engine oil present between the crankshaft bore and the journal.

Typically, a soft, and tough metallic bearing surface resides between the journal surface and the inner diameter of the large end bore. This soft metal surface reduces friction and provides some lubrication to the inner diameter and crankshaft journal. Traditionally, a copper-lead alloy is used for the bearing material. The relatively soft lead copper alloy provides lubrication, and eliminates most of the steel to steel contact that would cause seizing and engine failure.

The soft metal bearing combinations are susceptible to fatigue and failure. Metal bearings also increase the mass of the connecting rod assembly, and make the engine assembly process more complex.

The need for a connecting rod having a bearing-less large end capable of withstanding the high pressure exerted on the load bearing surface of the connecting rod is addressed in this invention. There is also need for a connecting rod that provides a cost-effective performance while remaining practical for production in a mass manufacturing environment.

BRIEF DESCRIPTION OF THE DRAWINGS

Referring now to the drawings, illustrative examples are shown in detail. The drawings represent the exemplary illustrations described in this application. The drawings are not to scale. Certain features may be exaggerated to better illustrate, and explain an innovative aspect of an exemplary illustration. The exemplary illustrations presented in this application are not intended to be exhaustive, limiting or restricting to the precise form and configuration shown in the drawings. Exemplary illustrations of the present invention are described in detail by referring to the drawings as follows.

DETAILED DESCRIPTION

Figure 1:
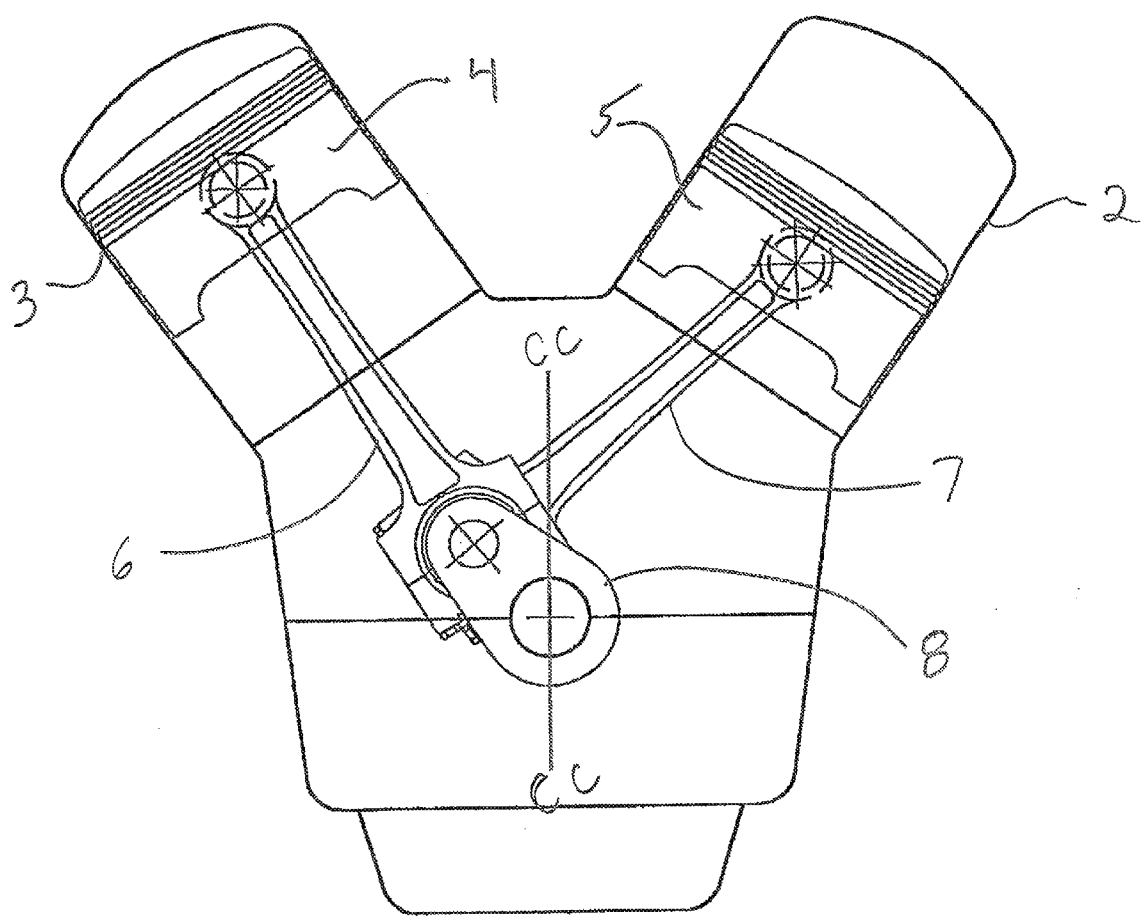
FIG. 1 illustrates a connecting rod, according to an exemplary illustration.

Referring now to the discussion that follows and also to the drawings, illustrative embodiments are shown in detail. Certain features may be exaggerated, removed, or partially sectioned to better illustrate and explain the present disclosure. The descriptions set forth in this application are not intended to be exhaustive limit or restrict the claims in any way to the precise form.

Various exemplary illustrations are directed connecting rods having a large/crankshaft end that includes a coating, thereby rendering the bearing employed with connecting rods in previous approaches unnecessary. Connecting rods may be formed by a manufacturing process such as forging, casting or a powdered metal forming process, merely as examples. The composition of the connecting rod material may include steel, cast iron, aluminum, titanium, magnesium, or any other materials that are convenient. The attached sketches illustrate seven exemplary illustrations, which are further described below.

In some exemplary approaches, a horizontal diameter of a surface configured to interface with a crankshaft pin, e.g., the large bore itself or a coated surface thereon, may be greater than a vertical diameter (e.g., defining an American Football" shape). This eccentricity of the surface interfacing with the crankshaft pin may generally improve oil lubrication about the interface between the crankshaft pin and the large end of the connecting rod. Eccentricity of the large bore may be provided by machining the bore and/or coated surface(s), merely as examples.

Connecting rods produced according to the embodiments in this invention have the advantage that they contain no bearing shell between the crankshaft journal and the inner diameter of the large bore During normal engine operation, the connecting rod transmits power from the piston to the crankshaft of the engine. Combustion power is generated by ignition of a combustible fuel-air mixture. The connecting rod converts the linear motion of the piston to rotational motion at the crankshaft. The fuel in this embodiment is usually petroleum based, but other types of fuel can be used. The combustion of the fuel-air mixture exerts extreme pressure on the piston and connecting rod. In order to transmit combustion power, the connecting rod is mechanically coupled to a piston by way of a piston pin (not shown).

The interface between the large end bearing surface and the crankshaft journal experiences continuous cyclical radial loads during operation. These cyclical loads applied to the bearing surfaces are the main cause of wear of the connecting rod bearings.

The illustrations are directed to connecting rods with a large crankshaft end. The large end bore inner diameter includes a thermally sprayed coating on the machined inner diameter of bearing surface where a soft metal bearing is usually installed. The thermal sprayed coating renders the bearing employed with connecting rods in previous approaches unnecessary.

In some embodiments, the horizontal diameter of the inner diameter of the large bore surface is configured to interface with a crankshaft journal may be greater than a vertical diameter. This eccentricity can be present in the coated and uncoated surface bore.

The eccentricity of the surface interfacing with the crankshaft pin may generally improve oil lubrication about the interface between the crankshaft journal and the large end bore of the connecting rod. Eccentricity of the large bore may be provided by machining the bore or coated surface(s), merely as examples.

The inside diameter, the load bearing surface of the large bore end, may be machined, and then a coating is applied, e.g., a metallic coating. One embodiment uses a thermal spray method e.g. HVOF, plasma or cold to apply the metallic and polymer coatings. One exemplary thermal spray coating consists of a copper (Cu) alloy, e.g., Cu—Sn, Cu—Sn—Bi, Cu—Sn—Ni or Cu—Sn—Bi—Ni, merely as examples. In other examples, an electroplate coating or a sputter coating may be employed.

The metallic coating may have a thickness of between approximately 50 and 400 microns. In another embodiment, the coating thickness is between approximately 150 and 200 microns. A third embodiment has a thickness of approximately 150 microns.

The metallic coating may be applied along location "A" illustrated in the drawing. After the "A" coating is applied, the next step may be a machining operation to rough the surface and provide a desired circular shape.

After the machining operation, a polymer coating may be applied to location "B." As illustrated in the drawing, the polymer coating is applied in a layer on the large bore, extending on top of the metallic coating. In one example, the polymer coating may have a composition of a mixture of aluminum particles (about 10-15%), a PolyTetraFlouroEthylene (PTFE, i.e., Teflon) (about 5-7%), a silane (about 4.5 to 5.0%), and the balance a PolyAmideImide material. Merely as examples, polymer coatings commercially available from MAHLE include polymer coatings available under the commercially known names F1 and F2. Polymer coatings such as those described in U.S. Pat. publication. No. 2011/0317955 may also be employed. The entire content of U.S. Pat. Pub. No. 2011/0317955 is hereby expressly incorporated by reference.

The polymer coating may be applied in a thin layer relative to any metallic coating. In one example, the polymer coating is approximately 3-5 microns thick, a second exemplary approach provides a coating 10 microns thick, and in a third example, the coating is approximately 3-15 microns thick. Some exemplary applications, the polymer coating may be as thick as 40 microns.

The metallic coating and polymer coating may generally combine to function as a substitute for a bearing. The bearingless design results in a lighter overall component due to elimination of a bearing component from the upper and lower connecting rod parts. A higher load capability may be possible than some previous embodiments using a separate bearing part.

An eccentric large bore shape may be created in the large bore surface. A metallic coating may be applied to the "A" location of the inner diameter of the large bore, as illustrated, with a thermal spray coating or any other metallic coating. In one approach, a thermal spray coating includes a copper (Cu) alloy, e.g., Cu—Sn, Cu—Sn—Bi, Cu—Sn—Ni or Cu—Sn—Bi—Ni, merely as examples. The metallic coating may have a thickness of between approximately 50 and 400 microns, a second exemplary illustration has a thickness of between approximately 150 and 200 microns, and a third exemplary illustration has a thickness of approximately 150 microns.

Merely as examples, a tri-metallic coating or a bimetallic coating may be employed, in one illustration, the bottommost end of the large bore includes a polymer coating only, i.e., which is directly applied to the metal bore surface.

More specifically, the entire inside diameter of the large bore has a polymer coating, similar to the first exemplary illustration described above. Machining of the large bore surface, e.g., prior to application of the polymer coating, may be required to provide the eccentric shape as illustrated.

The inside diameter of the large bore may be initially machined to form a horizontally eccentric shape. The eccentric shape is defined by the diameter D2 being greater than the diameter D1. A polymer coating, e.g., substantially as described above in the first exemplary illustration, may be applied directly to the metal, e.g., steel, surface along the entire inside diameter. Accordingly, the connecting rod big end will have eccentricity with a polymer coating, as a result of the horizontal diameter D2 being larger than the vertical diameter D1.

A thermal spray coating may be applied on the entire inside diameter, and (absent other machining) a polymer coating may be applied on top of the thermal spray coating. The polymer coating as applied may eliminate the asperity resulting from the thermal spray, and may result in the horizontally eccentric shape detailed in the first three exemplary illustrations above.

The thermal spray in combination with machining of the large bore inside diameter surface may provide a desired eccentricity of the bore opening. For example, as shown in the fourth exemplary illustration, a generally circular bore opening may be thermally sprayed and the thermal spray coating may be subsequently machined to form a horizontally eccentric opening. Alternatively, the inside diameter of the large bore surface may be machined to provide some or all of the eccentric shape prior to application of the thermal spray coating. Subsequently, the thermal spray coating may be machined further to provide the desired eccentricity. A polymer coating may be applied to the thermal spray coating afterwards.

The entire application of a thermal spray coating along the inside diameter may generally offer a safeguard so to speak, e.g., if the polymer coating fails, is otherwise suspect or not durable. For example, if the engine is not clean (e.g., iron or aluminum particle(s) interrupts oil film) the polymer coating may be compromised. The thermal spray coating may thereby provide an extra layer of protection, which is not currently offered by previous approaches, i.e., by the combination of the polymer and thermal spray coatings together.

A thermal spray coating may be subsequently applied on the entire inside diameter. A polymer coating may be applied on top of the thermal spray coating. As applied, the polymer coating may generally eliminate the asperity resulting from the thermal spray. As illustrated, the large bore may define a substantially circular shape, and the metallic thermal spray coating may be applied in a generally constant thickness. The polymer coating can be applied in a varying thickness about the large bore such that an eccentric shape and is generally defined by the surface of the polymer coating.

An embodiment allows the extreme upper and lower areas of the large bore may be machined to receive a polymer coating. The machining operation does not finish or machine the eccentric zones beneath the coating. This will allow optimal performance as a result of the oval shape. In examples where a varying polymer layer thickness is employed, ease of machining and a lower material cost may generally result from the reduced material requirements and/or more efficient placement of the polymer coating layer.

In one embodiment metallic thermal spray coating, is applied only along the shaded areas indicated along the edges of the inside diameter of the large bore. The remainder of the inside diameter of the large bore coated with a polymer coating. The thermal spray coating along the edges of the inside diameter as shown may offer conformability and strength, especially in applications where edge loading is a concern.

In some exemplary approaches, the polymer coating may be applied in a partial coat. A partial coating of the polymer may allow localized concerns to be more efficiently addressed by applying a coating only within those local areas, e.g., by applying the coating along the ends of the bore to address edge loading.

FIG. 1 illustrates a basic internal combustion engine. The reciprocating piston-type having multiple cylinders is configured for installation in a motor vehicle (not shown). The engine includes a single or two cylinder rows 2, 3 in a straight line or V-shaped arrangement in which the pistons 4, 5 operate. The pistons 4, 5 are connected by respective connecting rods 6, 7 to a crankshaft 8. The crankshaft is accommodated by crankshaft bearing surface. The crankshaft bearing surfaces are arranged in a housing made of a light metal alloy and have bearing bores for crank pins of the crankshaft 8.

Figure 2:
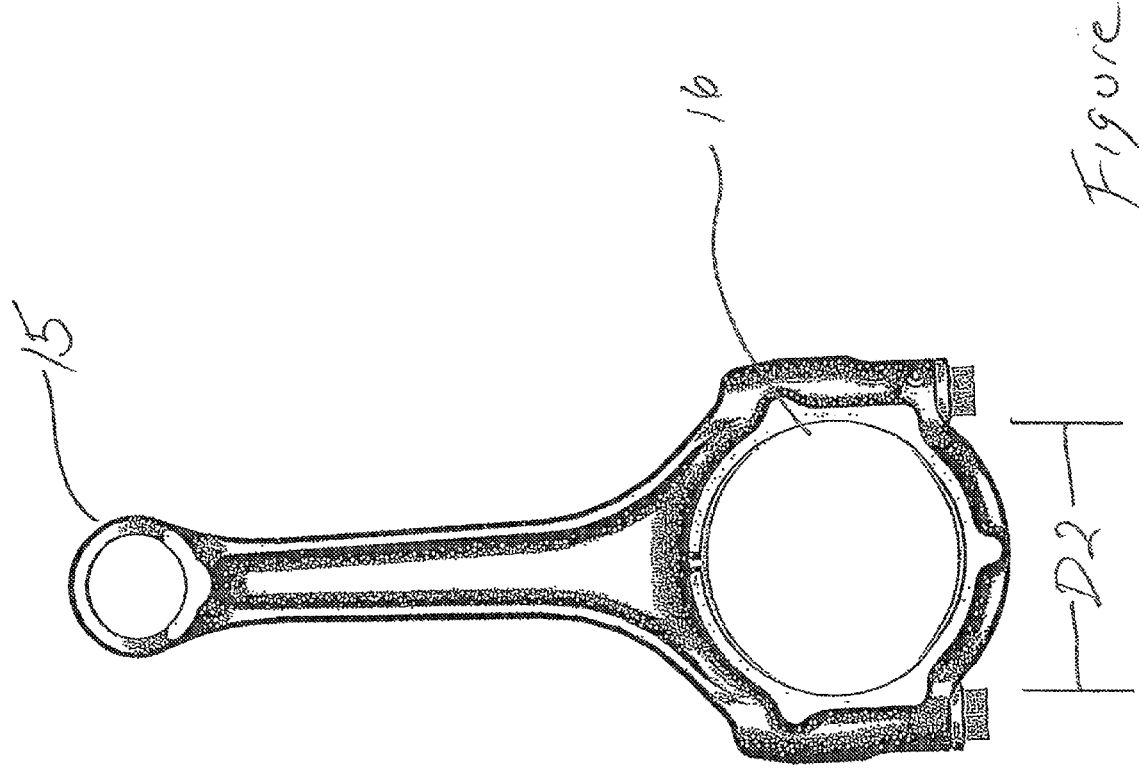
FIG. 2 illustrates a connecting rod, according to another exemplary illustration.

FIG. 2 illustrates a connecting rod. The small bore end 15 is attached to the piston via a piston pin (not shown) and a large bore end 16 that is attached to the crankshaft journal.

Figure 3:
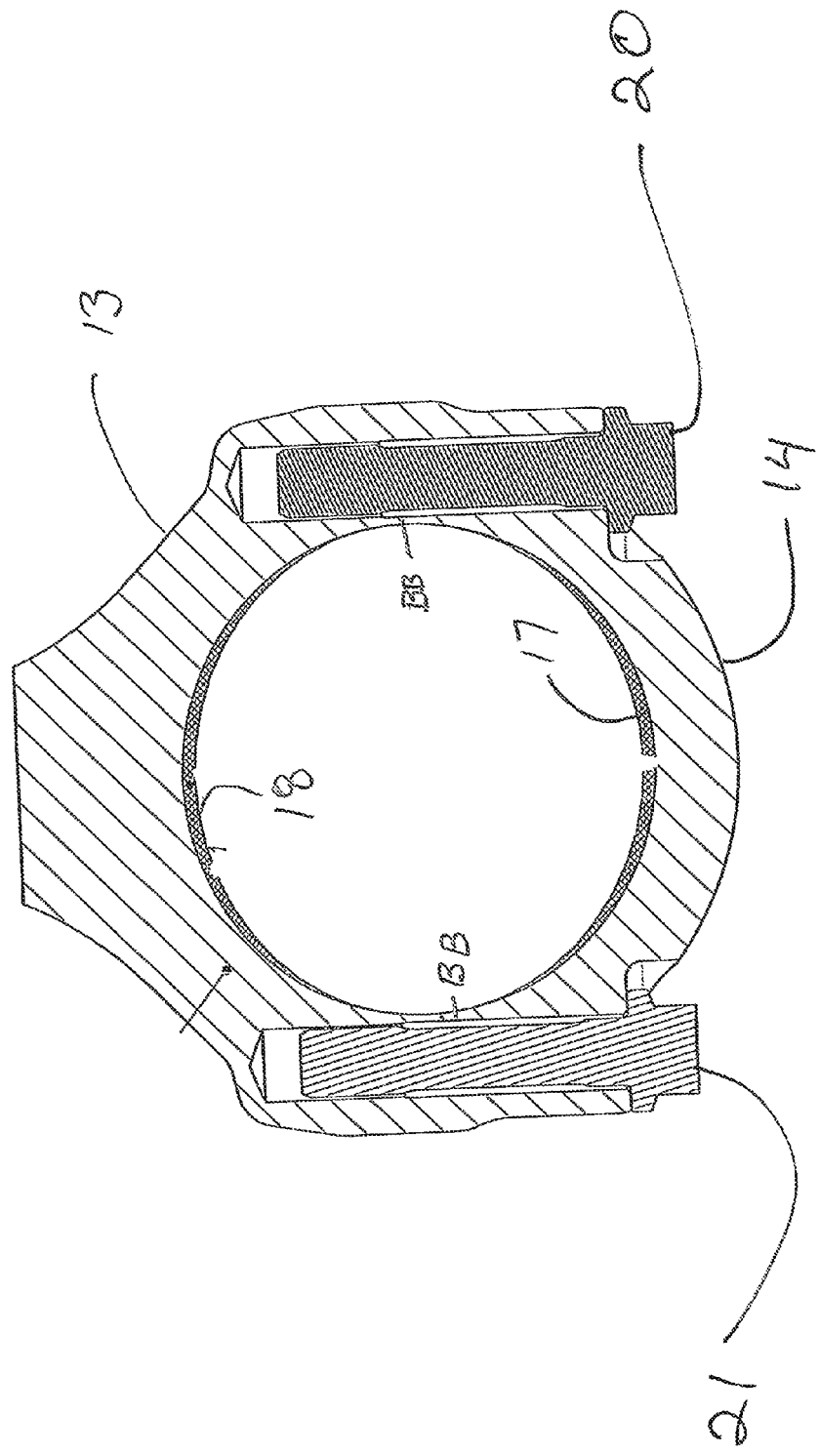
FIG. 3 illustrates the large end of the connecting rod, and the thermally sprayed inner diameter surfaces.

FIG. 3 shows the first bearing section 13 and a second bearing section 14 with first thermally sprayed bearing surface 17 and second sprayed bearing surface 18. The sprayed surfaces are provided on both sides of a bearing parting plane B-B.

The second sprayed bearing surface 17, extends across a central longitudinal plane C-C of the crankshaft 8. Neighboring (or adjoining) sprayed bearing surfaces 17 and 18. 13 and 14 are supported and secured by connecting elements 20 and 21, and at least the sprayed bearing surface 17 and 18, also be referred to as bearing crowns.

Figure 4:
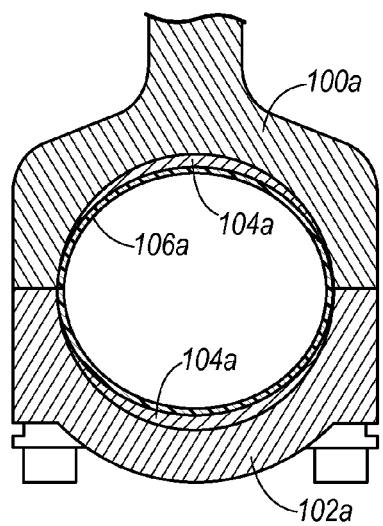
FIG. 4 illustrates a connecting rod, according to an exemplary illustration.

Turning now to FIG. 4, an exemplary illustration of a connecting rod large end comprising an upper portion 100a and lower portion 102a. The connecting rod has a generally vertical ovalization of the big end. For example, the inside diameter of the large bore may be machined. Subsequently, a coating may be applied, e.g., a metallic coating 104a. In one example, the metallic coating 104a is a thermal spray coating applied along the inner diameter of the bore as illustrated in FIG. 4. One exemplary thermal spray coating employs a copper (Cu) alloy, e.g., Cu—Sn, Cu—Sn—Bi, Cu—Sn—Ni or Cu—Sn—Bi—Ni, merely as examples. In other examples, an electroplate coating or a sputter coating may be employed. The metallic coating 104a may have a thickness of between approximately 50 and 400 microns (μm), and in another exemplary illustration has a thickness of between approximately 150 and 200 microns (μm), and in yet another exemplary illustration has a thickness of approximately 150 microns (μm). After the metallic coating 104a is applied, the next step may be a machining operation to rough the surface and provide a desired circular shape. More specifically, an ovalization of the outermost edges of the large bore (i.e., edge closest to the shaft or I-Beam of the connecting rod) may be formed.

After machining, a polymer coating 106a may be applied. As shown in FIG. 4, the polymer coating 106a is applied in a layer on the large bore, extending on top of the metallic coating 104a. In one example, the polymer coating 106a may have a composition of a mixture of aluminum particles (about 10-15%), a PolyTetraFlouroEthylene (PTFE, i.e., Teflon) (about 5-7%), a silane (about 4.5 to 5.0%), and the balance a PolyAmideImide material. Merely as examples, polymer coatings commercially available from MAHLE include polymer coatings available under the commercially known names F1 and F2. As another example, polymer coatings such as those described in U.S. Pat. Pub. No. 2011/0317955 may also be employed. Accordingly, the contents of U.S. Pat. Pub. No. 2011/0317955 are hereby expressly incorporated by reference in their entirety.

The polymer coating 106a may be applied in a thin layer relative to any metallic coating. In one example, the polymer coating is approximately 3-5 microns (μm) thick, and in another exemplary approach the coating is approximately 10 microns (μm) thick. In yet another example the coating is approximately 3-15 microns (μm) thick. While relatively thin polymer coatings may be employed, in some exemplary approaches the polymer coating 106a may be as thick as 40 microns (μm).

The metallic coating 104a (e.g., thermal spray coating) and polymer coating 106a may generally combine to function as a substitute for a bearing (i.e., a bearingless connecting rod). This design enables a lighter overall component, and a possible reduction of cost due to elimination of a bearing component from the upper and lower connecting rod parts 100a, 102a. Moreover, a higher load capability may be possible than some previous approaches employing a separate bearing part.

Figure 5:
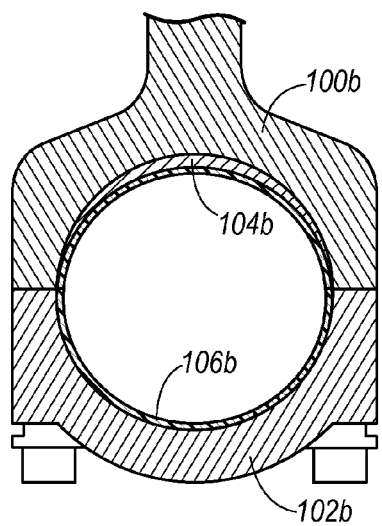
FIG. 5 illustrates a connecting rod, according to an exemplary illustration.

Turning now to FIG. 5, another exemplary illustration of a connecting rod large end having an upper portion 100b and lower portion 102b is shown. An ovalization of the large bore surface may be created in the large bore surface. A metallic coating 104b may be applied as shown along the inner diameter of the large bore, as illustrated, e.g., with a thermal spray coating 104a or any other metallic coating. In one approach, a thermal spray coating 104a includes a copper (Cu) alloy, e.g., Cu—Sn, Cu—Sn—Bi, Cu—Sn—Ni or Cu—Sn—Bi—Ni, merely as examples. The metallic coating may have a thickness of between approximately 50 and 400 microns (μm), and in another exemplary illustration has a thickness of between approximately 150 and 200 microns (μm), and in yet another exemplary illustration has a thickness of approximately 150 microns (μm). Merely as examples, a tri-metallic coating or a bimetallic coating may be employed. As shown in FIG. 5, the bottom-most end of the large bore includes a polymer coating 106b only, i.e., which is directly applied to the metal bore surface. More specifically, the entire inside diameter of the large bore has a polymer coating 106b, similar to the exemplary illustration shown in FIG. 4. Machining of the large bore surface, e.g., prior to application of the polymer coating 106b, may be required along the areas in which the polymer coating 106b is applied to provide the ovality as illustrated.

Figure 6:
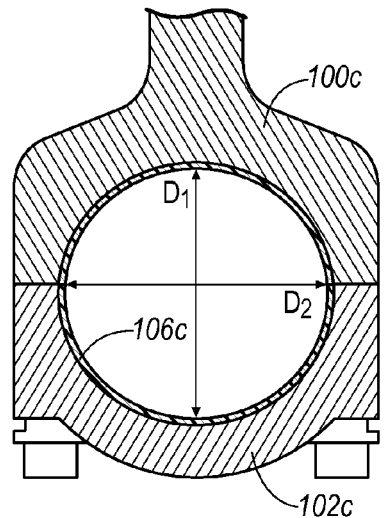
FIG. 6 illustrates a connecting rod, according to an exemplary illustration.

In another exemplary illustration shown in FIG. 6, the inside diameter of a large bore of a connecting rod having an upper portion 100c and lower portion 102c may be initially machined, and subsequently may be horizontally ovalized such that the diameter $D_2$ is greater than the diameter $D_1$. A polymer coating 106c, e.g., substantially as described above in the exemplary illustration of FIG. 4, may be applied directly to the metal, e.g., steel, surface along the entire inside diameter. Accordingly, the connecting rod large end will have eccentricity with a polymer coating 106c, as a result of the horizontal diameter $D_2$ being larger than the vertical diameter $D_1$.

Figure 7:
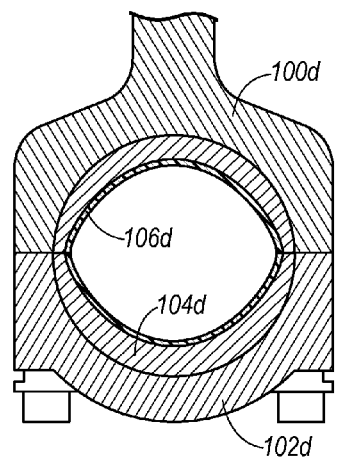
FIG. 7 illustrates a connecting rod, according to an exemplary illustration.

Turning now to FIG. 7, another exemplary illustration is shown of a connecting rod large bore that may be machined in upper and lower portions 100d, 102d of the connecting rod. A thermal spray coating 104d may be applied on the entire inside diameter, and (absent other machining) a polymer coating 106d may be applied on top of the thermal spray coating 104d. The polymer coating 106d as applied may eliminate the asperity resulting from the thermal spray, and may result in the horizontally ovalized (e.g., "American Football") shape such as that shown in the exemplary illustrations of FIGS. 4, 5, and 6. The thermal spray coating 104d, in combination with machining of the large bore inside diameter surface, may provide a desired ovality of the bore opening. For example, as shown in FIG. 7, a generally circular bore opening may be thermally sprayed and the thermal spray coating 104d may be subsequently machined to form a horizontally ovalized opening. Alternatively, the inside diameter of the large bore surface may be machined to provide some or all of the ovality prior to application of the thermal spray coating 104d, and subsequently the thermal spray coating 104d may be machined further to provide a desired ovality. A polymer coating 106d may be applied to the thermal spray coating 104d afterwards.

The entire application of a thermal spray coating 104d along the inside diameter may generally offer a safeguard, e.g., if the polymer coating fails or is otherwise suspect or not durable. For example, if the engine is not clean (e.g., iron or aluminum particle(s) interrupts oil film) the polymer coating 106d may be compromised. The thermal spray coating 104d may thereby provide an extra layer of protection which is not currently offered by previous approaches, i.e., by the combination of the polymer 106d and thermal spray coatings 104d together.

Figure 8:
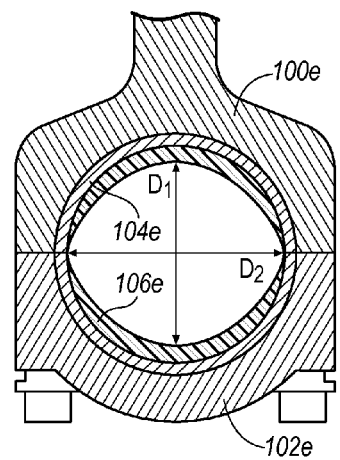
FIG. 8 illustrates a connecting rod, according to an exemplary illustration.

Turning now to FIG. 8, another exemplary illustration is shown of a connecting rod having an upper portion 100e and lower portion 102e, in which a large bore of the connecting rod may initially be machined. A thermal spray coating 104e may be subsequently applied on the entire inside diameter, and (absent other machining) a polymer coating 106e may be applied on top of the thermal spray coating 104e. As applied, the polymer coating 106e may generally eliminate the asperity resulting from the thermal spray 104e, but is sprayed in a manner to achieve the shape of an "American Football" shape, e.g., as generally described in the exemplary approaches shown in FIGS. 4 and 5. As illustrated, the large bore may define a substantially circular shape, and the thermal spray coating 104e may be applied in a generally constant thickness, while the polymer coating 106e is applied in a varying thickness about the large bore such that an eccentric shape, e.g., the horizontally ovalized "American Football" shape, is generally defined by the surface of the polymer coating 106e. Alternatively, the extreme upper and lower areas of the large bore may be machined to receive a polymer coating 106e, while not finishing or machining the eccentric zones beneath the coating, thereby allowing optimal performance as a result of the ovalized shape. In examples where a varying thickness of polymer layer 106e is employed, ease of machining and a lower material cost may generally result from the reduced material requirements and/or more efficient placement of the polymer coating layer 106e.

Figure 9:
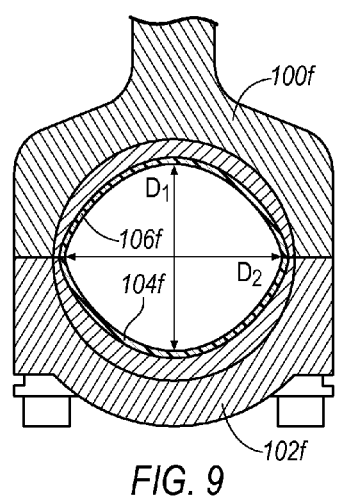
FIG. 9 illustrates a connecting rod, according to an exemplary illustration.

Turning now to the FIG. 9, another exemplary illustration is provided of a large bore of a connecting rod, which may be machined. A thermal spray 104f may then be applied on the entire inside diameter of the large bore, and may then be machined to provide a horizontally oval shape (e.g., an "American Football" shape). Additionally, a polymer coating 106f may be applied over the thermal spray coating 104f.

Figure 10A:
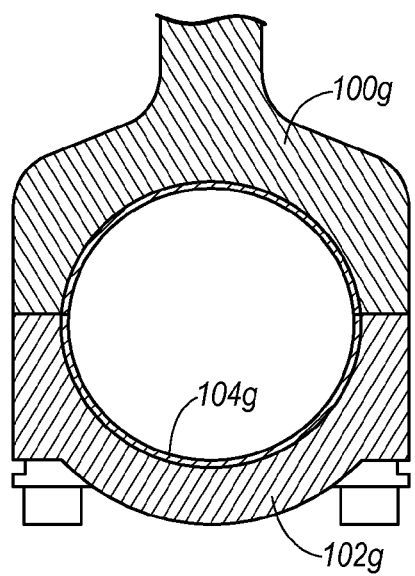
FIG. 10A illustrates a connecting rod, according to an exemplary illustration.
Figure 10B:
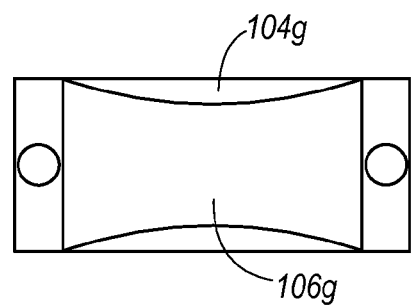
FIG. 10B illustrates the connecting rod lower portion of FIG. 10A, according to an exemplary illustration.

Turning now to FIGS. 10A and 10B, another exemplary illustration is shown of a connecting rod large bore end. In this example, a metallic coating 104g, e.g., a thermal spray coating, is applied only along the areas indicated along the edges of the inside diameter of the large bore, with the remainder of the inside diameter of the large bore coated with a polymer coating 106g. The thermal spray coating 104g along the edges of the inside diameter as shown may generally offer conformability and strength, especially in applications where edge loading is a concern.

Moreover, in some exemplary approaches, the polymer coating 106g may be applied in a partial coat. A partial coating of the polymer 106g may allow localized concerns to be more efficiently addressed by applying a coating only within those local areas, e.g., by applying the coating along the ends of the bore to address edge loading.

The processes, systems, methods, heuristics, etc. described in this application have been described as occurring according to a certain ordered sequence. The processes could be practiced with the described steps performed in an order other than the order described in this application. Certain steps of the process can be performed simultaneously. Additional steps can be added, or certain steps described in this application can be omitted. The descriptions of processes in this application are provided for the purpose of illustrating certain embodiments. They should not be construed so as to limit the claimed invention. It is to be understood that the above description is intended to be illustrative and not restrictive. The scope of the invention should be determined, not with reference to the above description. It should be determined with reference to the claims, and with the full scope of equivalents to which the claims are entitled. It is anticipated, and intended that future developments will occur in the arts discussed in this application. The disclosed systems and methods will be incorporated into such future embodiments. It should be understood that the invention is capable of modification, variation, and is limited only by the following claims.

All terms used in the claims are intended to be given their broadest reasonable constructions and ordinary meanings as understood by those skilled in the art. Unless an explicit indication to the contrary in made in this application the broadest possible meaning is to be used. In particular, use of the singular articles such as "a," "the," "said," etc. should be read to recite one or more of the indicated elements unless a claim recites an explicit limitation to the contrary.

We claim:

1. A connecting rod comprising:
   a beam connecting a first end and a second end, the first end larger than the second end, the first end defining a first bore and the second end defining a second bore, a diameter of the first bore being greater than a corresponding diameter of the second bore; and
   a polymer coating disposed within the first bore, the polymer coating positioned within the first bore and configured to contact a crankshaft pin, wherein at least a portion of the polymer coating is applied directly to the first bore;
   wherein the first end includes first end upper and lower portions, the first end upper portion defining an upper portion of the first bore, the first end lower portion defining a lower portion of the first bore, the upper portion having a metallic coating applied to the upper portion of the first bore, the metallic coating interposed between a surface of the first bore and the polymer coating; and
   wherein the polymer coating is applied directly to the lower portion of the first bore, and the polymer coating is applied directly to the metallic coating along the first end upper portion.

2. The connecting rod of claim 1, further comprising a metallic coating, the metallic coating interposed between a surface of the first bore and a polymer coating.

3. The connecting rod of claim 2, wherein the metallic coating is a thermally sprayed coating.

4. The connecting rod of claim 3, where the metallic coating includes a copper alloy.

5. The connecting rod of claim 2, where the metallic coating is composed of a tin electroplated coating and an aluminum-tin sputter coating.

6. The connecting rod of claim 2, wherein the metallic coating is applied in one of an electroplating coating process and a sputter coating process.

7. The connecting rod of claim 1, wherein the polymer coating defines a thickness of between 3-40 microns.

8. The connecting rod of claim 1, wherein the polymer coating includes a poly-amide-imide (PAI), aluminum particles, polytetraflouroethylene (PTFE), and a silane.

9. The connecting rod of claim 1, wherein at least one of the first bore and the polymer coating defines an eccentric or oval shape.

10. The connecting rod of claim 2, wherein the thermal spray coating defines a thickness between approximately 50 and 400 microns.

11. The connecting rod of claim 9, wherein the eccentric shape defines a diameter in a direction generally perpendicular to that defined by the first diameter extending coaxial with respect to the shaft.

12. The connecting rod of claim 1, wherein the metallic coating includes a copper alloy.

13. The connecting rod of claim 1, wherein the first bore has an axially curved profile configured to distribute a load across a surface of the profile.

14. The connecting rod of claim 1, wherein the polymer coating is applied directly to at least a portion of the first bore.

15. A connecting rod, comprising:
   a beam connecting a first end and a second end, the first end larger than the second end, the first end defining a first bore and the second end defining a second bore, a diameter of the first bore being greater than a corresponding diameter of the second bore; and
   a polymer coating disposed within the first bore, the polymer coating positioned within the first bore and configured to contact a crankshaft pin;
   wherein the first end includes first end upper and lower portions, the first end upper portion defining an upper portion of the first bore, the first end lower portion defining a lower portion of the first bore, the upper portion having a thermally sprayed metallic coating applied to the upper portion of the first bore, the metallic coating interposed between a surface of the first bore and the polymer coating; and
   wherein the polymer coating is applied directly to the lower portion of the first bore, and the polymer coating is applied directly to the metallic coating along the first end upper portion.

16. The connecting rod of claim 15, wherein the metallic coating includes a copper alloy.

17. The connecting rod of claim 15, wherein the polymer coating defines a thickness of between 3-40 microns, and the thermal spray coating defines a thickness between approximately 50 and 400 microns.

18. The connecting rod of claim 15, wherein the polymer coating includes a poly-amide-imide (PAI), aluminum particles, polytetraflouroethylene (PTFE), and a silane.

19. The connecting rod of claim 15, wherein at least one of the first bore and the polymer coating defines an eccentric shape.

* * * * *